June 18, 1963  L. H. AVILA  3,094,113
OUTDOOR COOKING UNIT
Filed June 5, 1961  2 Sheets-Sheet 1
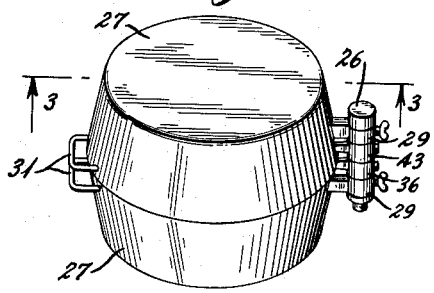
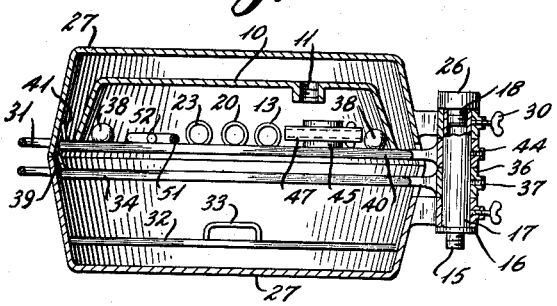
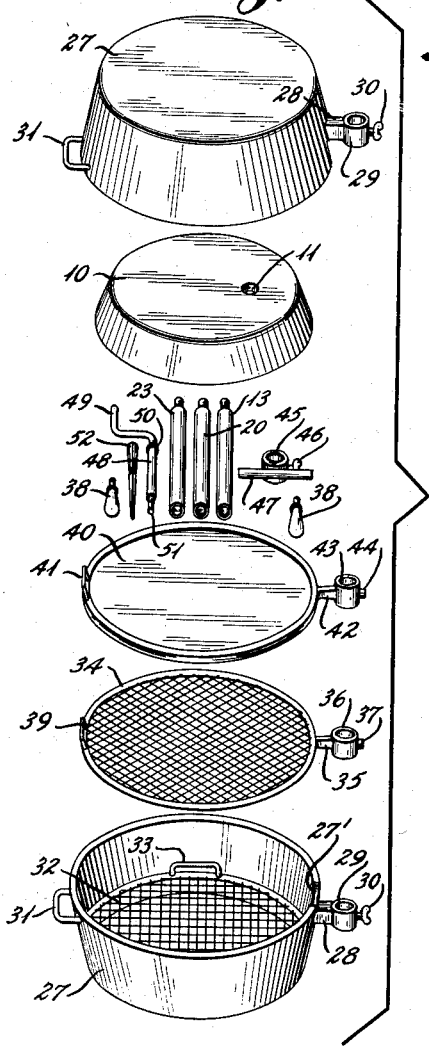
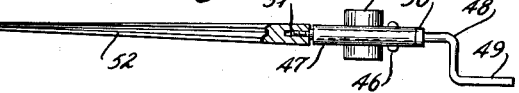
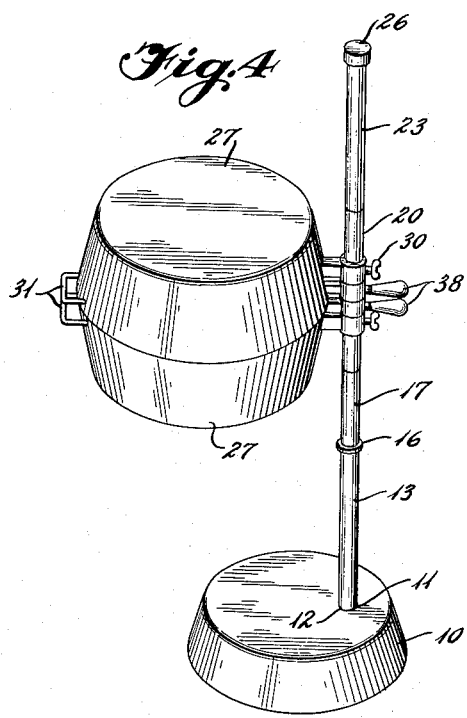
INVENTOR
Lawrence H. Avila
BY
ATTORNEY

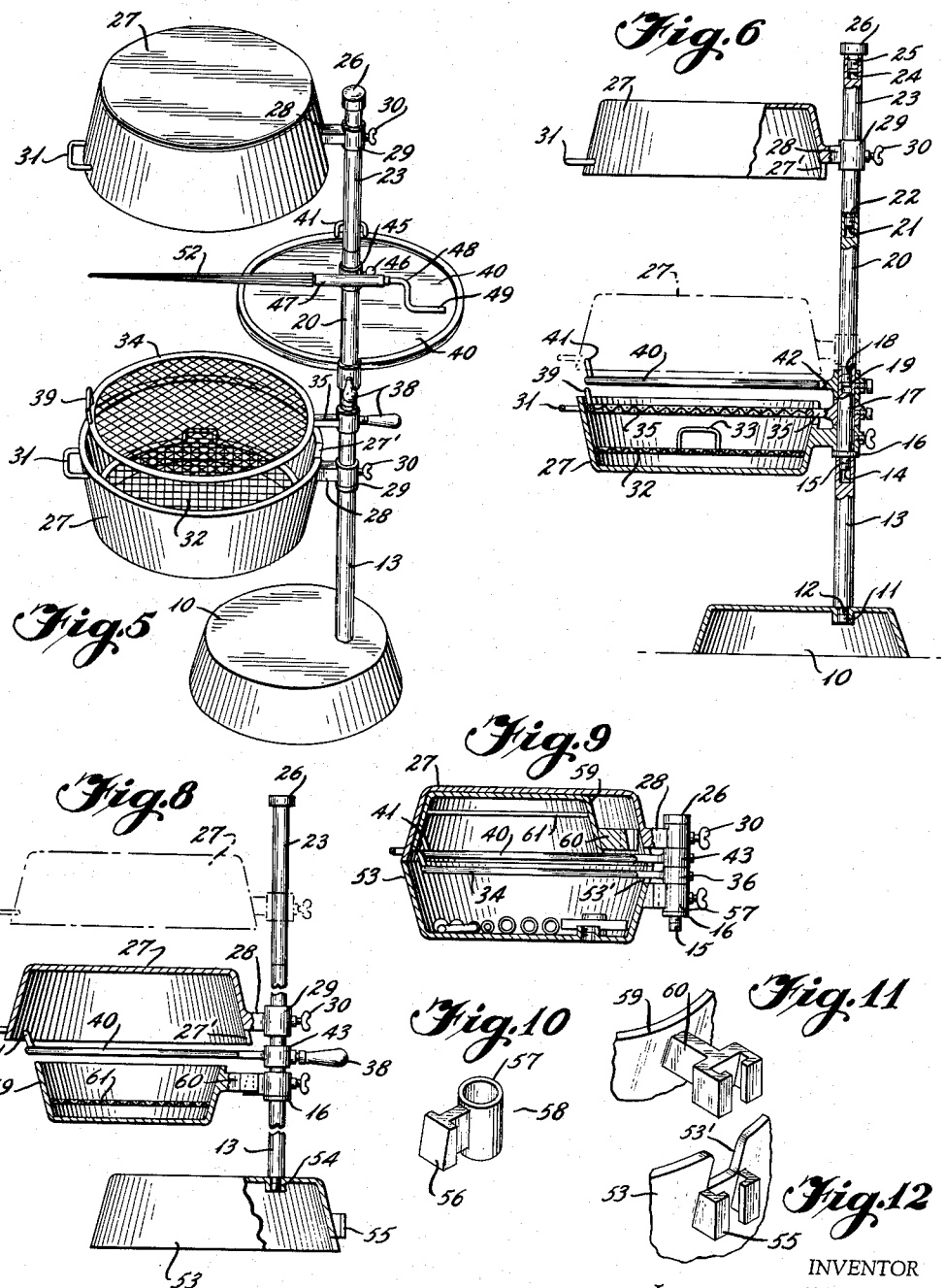

United States Patent Office 3,094,113
Patented June 18, 1963

3,094,113
OUTDOOR COOKING UNIT
Lawrence H. Avila, 1408 Donaghey Bldg.,
Little Rock, Ark.
Filed June 5, 1961, Ser. No. 114,969
3 Claims. (Cl. 126—30)

This invention relates to the preparation and serving or dispensing of foods of various kinds and in various places and to equipment employed by which such foods as well as other objects may be held and in a manner in which the temperature of the same may be readily changed as well as with the utensils supported for ready accessibility of the matter supported.

The invention relates particularly to utensils of the character employed in the preparation and serving of foods, which utensils can be readily assembled for use or taken apart and stored or transported, and by means of which the various steps in the preparation and serving of foods may be greatly simplified and made easy instead of tedious.

Cooking utensils of various kinds have been employed in connection with the indoor and outdoor preparation and serving of foods. These have been selected at random and consequently with no cooperative relation or means for keeping them together as a unit and they have been awkward to handle, bulky, easily upset, and otherwise unsatisfactory.

It is an object of the invention to provide apparatus including utensils for use in the preparation and serving of foods, and by means of which the several utensils may be carried on a single support, as well as apparatus by which such utensils may be housed or contained when they are not in use.

Another object of the invention is to provide utensils which may be used for containing temperature modification means such as glowing embers, ice or the like and for adjustably supporting other utensils all on a simple support and which utensils and support can be compactly placed in a housing composed of two of said utensils for storage and transportation when not in use.

Other objects and advantages of the invention will be apparent from the following description taken in conjunction with the accompanying drawings, wherein:

FIG. 1 is a perspective illustrating one application of the invention;

FIG. 2, an exploded perspective of the several parts;

FIG. 3, a central section on the line 3—3 of FIG. 1;

FIG. 4, a perspective illustrating one use of the invention;

FIG. 5, a similar view of the parts in a different arrangement;

FIG. 6, a central section through certain of the parts of FIG. 5;

FIG. 7, a detail perspective of the skewer and its mounting means;

FIG. 8, a side elevation of a modified form of the invention;

FIG. 9, a vertical section of the parts in compact packaged relation;

FIG. 10, a modified form of mounting means; and

FIGS. 11 and 12, fragmentary detail perspectives having mounting means complementary to that of FIG. 10.

Briefly stated, the invention relates to a single pedestal cantilevered multiple position food treatment kit or unit composed of a group of utensils and a sectional supporting post for the holding preparation and serving or dispensing of foods, and with such utensils of complementary sizes and shapes so that they can be combined with the post forming segments and compactly nested in two of such utensils as a housing and fastened to a segment of said post and providing a compact unit of a relatively small size for storage or shipment and which can be assembled so that one of the utensils forms a base or pedestal carrying the post segments with the utensils rotatably adjustable thereon so that a fire box or container for a temperature modification medium is provided with a hood thereover.

With continued reference to the drawings, the present invention comprises a kit or unit including a base forming utensil 10 on which the device is adapted to be mounted and supported. The base forming utensil has a threaded opening 11 in which, when the parts are assembled, is adapted to be received the threaded end 12 of a post segment 13 to which there are additional segments to be described such post segment 13 having its upper end (FIG. 6) provided with internal threads 14.

In the threaded end 14 of the post segment is received the adjacent threaded end 15 adjacent to a stop flange 16 of a second shorter post segment 17, having an internal threaded opposite end 18 for receiving the externally threaded end 19 of a third post segment 20.

The remote end of the post segment 20 is provided with internal threads 21 for receiving the external threads 22 on the adjacent end position of a post segment 23. The remote end of the post section 23 is provided with internal threads 24 for the receipt of the external threads 25 of a closure or finishing plug 26. While the straight side walls of the threaded portions of the post sections or segments are illustrated as parallel and threaded they may be otherwise and threadless if desired for quick assembly and dismantling of the unit.

The base 10 is formed of one of the inverted pans or receptacles and is of sufficient size or breadth to provide an adequate support for the several sections which constitute the post in order to receive and hold a series of cooking articles. Likewise the post may be attached thereto off center to provide a means of balancing the heavier utensils.

Two of the utensils 27 are of like construction and each is provided with an arm or mounting bracket 28 terminating in a sleeve 29 of a size to slidably receive and be located anywhere along the length of the post. The sleeve 29 can be fastened in a fixed position by means of a setscrew 30. Each of the pans or utensils 27 additionally may be provided with a handle 31, and may be disposed so that they open upwardly or downwardly and when one is inverted over and fitted to another a closed housing or container is formed in which all the parts may be compactly nested.

In order to secure the parts together in a compact package one of the post sections, for example, the odd or shorter post section 17 is retained and fastened within the mounting sleeve of the several utensils as will be understood more fully as the description proceeds.

The housing or container described is illustrated in FIGS. 1, 3 and 4, but in FIG. 4 it is illustrated without the containing of the parts which form the base and the post. In FIGS. 5 and 6, the containers are illustrated as mounted on the segment of the post in opposed relation and in a manner that the upper container may provide a smoke hood.

In order to complete the kit, a grate 32 may be provided to support burning embers, ice, or the like within the lower pan or utensil 27 and to allow ventilation thereunderneath. The grate 32 may have diametrically opposed handles 33 to facilitate its being lifted and handled.

A screen type grille 34 may be provided on which food or the like may be supported during subjection to the heat modification contents of the lower pan or utensil 27. The grille may have a supporting bracket 35 attached to it which terminates in a sleeve 36 slidably receivable on the post. The sleeve 36 has a threaded opening 37 for a setscrew handle 38 by means of which the grille may be fastened in adjusted position on the post. The grille also may have a handle 39 for the ease of handling.

In like manner a griddle 40 may be provided and have a handle 41 and be supported by a bracket 42 and a sleeve 43 of a size to slidably receive the post, such sleeve having a threaded opening 44 for the receipt of an additional setscrew handle 38. It will be apparent that the grille 34 and the griddle 40 may be used in any position around the post and for the support of objects other than those that are being cooked or subjected to heat modification. Also it will be apparent that the containing utensils 27 have cut out portions 27' to accommodate the brackets.

In order to support and rotate objects to be cooked, a sleeve 45 may be provided for elevational adjustment on the supporting post and with a wing nut 46 by means of which the sleeve may be secured at the desired height. To the sleeve 45 is attached a horizontal sleeve 47 in which is rotatably mounted a shaft 48 having a crank handle 49 by means of which the shaft may be rotated. The shaft 48 is provided with a shoulder 50 for limiting its movement through the sleeve 47 and the outer end of the shaft is provided with a threaded portion 51 for the receipt of an internally threaded skewer or spear 52.

It will be apparent from the foregoing that a device is provided which includes a base or pedestal for the post for supporting the latter in upright position and on which post there may be vertically adjustable a series of elements for the supporting of the several utensils, for supplying heat for cooking, or for removing heat, and including a grille, a griddle, and a cover therefor.

The upper and lower pans or utensils 27 may be placed together to form a holder or container for the remaining portions of the device held together by their attachment to the short post 17 and by which the parts are locked together as illustrated in FIGS. 1 and 3 and which may have the finishing closure or cap 26 applied thereto.

FIGS. 8 to 12 disclose a modification of the device in which a base forming utensil 53 replaces the lower pan 27 and has a threaded opening 54 into which the post 13 is adapted to be threaded when the device is assembled. The base 53 has a dovetail fastening yoke 55 located on the side of the base by means of which such base receives a dovetail bracket 56 carried by a sleeve 57 slidable on the post and adapted to be held in place by a setscrew 58 when the device is nested (FIG. 9). The utensil 53 is provided with a slot 53' to accommodate the brackets 35 and 42 when the parts are nested.

This dovetail type of connection may be used whereever desired and if preferred a smaller fire holding pan or utensil 59 may be provided having a bracket 60 corresponding to bracket 55 adapted to fit over the projection 56 on the sleeve 57 in order that the fire pan 59 may be supported at the desired elevation. If desired the fire pan 59 may be provided with a screen or other type grille 61. It will be apparent that in view of the numerous utensils provided considerable latitude may be exercised in the support of food and other objects during the cooking or heat addition or removal and serving of the same as well as at other times.

A kit or unit of the character described is relatively simple and inexpensive, occupies a small amount of space when compactly assembled for storage transportation or the like, and can be readily assembled for various uses or taken apart and when in use the utensils may be disposed in different positions and at different elevations on the post.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. An outdoor cooking unit comprising a supporting post of multiple connected segments and a plurality of utensils, certain of said utensils having wall structure defining open top pans and being of a size and shape to be disposed with their open tops in contiguous relation to provide a housing for the other utensils, bracket means on said certain utensils for connection to one of the segments of said supporting post for holding said utensils in housing forming relation, the segments of the post other than that connected to the bracket means being of a length less than the internal diameter of said certain utensils and capable of being readily contained therein, whereby the remainder of the utensils and the remainder of the segments of the post will be contained within the housing when the unit is not in use.

2. The structure of claim 1 in which one of the utensils is a base, means on said multiple segments for connecting said segments in longitudinal alignment to form a single post, and means on said base to support said post in generally upright position when in use.

3. The structure of claim 1 including bracket means connecting said utensils to said post in a position of use.

References Cited in the file of this patent

UNITED STATES PATENTS

| | | |
|---|---|---|
| 750,190 | Henault | Jan. 19, 1904 |
| 1,309,776 | Powers | July 15, 1919 |
| 2,805,658 | Schlueter | Sept. 10, 1957 |
| 2,827,846 | Karkling | Mar. 25, 1958 |
| 2,960,979 | Stone | Nov. 22, 1960 |